(12) United States Patent
Annakov et al.

(10) Patent No.: US 11,869,155 B2
(45) Date of Patent: Jan. 9, 2024

(54) AUGMENTED-REALITY BAGGAGE COMPARATOR

(71) Applicant: App in the Air, Inc., Bellevue, WA (US)

(72) Inventors: Bayram Annakov, Seattle, WA (US); Sergey Pronin, Miusinsk (RU)

(73) Assignee: APP IN THE AIR, INC., Bellevue, WA (US)

( * ) Notice: Subject to any disclaimer, the term of this patent is extended or adjusted under 35 U.S.C. 154(b) by 195 days.

(21) Appl. No.: 16/794,578

(22) Filed: Feb. 19, 2020

(65) Prior Publication Data
US 2020/0273257 A1 Aug. 27, 2020

Related U.S. Application Data

(60) Provisional application No. 62/808,606, filed on Feb. 21, 2019.

(51) Int. Cl.
*G06T 19/00* (2011.01)
*G06T 15/08* (2011.01)

(52) U.S. Cl.
CPC .......... *G06T 19/006* (2013.01); *G06T 15/08* (2013.01); *G06T 2200/24* (2013.01)

(58) Field of Classification Search
None
See application file for complete search history.

(56) References Cited

U.S. PATENT DOCUMENTS 10,268,892 B1 * 4/2019 Miller .................. H02J 7/025

OTHER PUBLICATIONS

Garcia, "This App Uses Augmented Reality to Show You Your Seat Before You Step on the Plane", published Oct. 27, 2017, retrieved from https://www.travelandleisure.com/travel-tips/mobile-apps/app-in-the-air-vr-flight-booking on Jan. 26, 2021.*
Monkey-Miles, "Interline Agreement: How Your Bags Get Transferred Across Multiple Carriers", published Jun. 9, 2016, retrieved from https://monkeymiles.boardingarea.com/interlining-how-your-bags-get-transferred-across-multiple-carriers/ on Jan. 27, 2021.*

(Continued)

*Primary Examiner* — Sarah Lhymn

(57) ABSTRACT

The current document is directed to methods and systems that provide an automated augmented-reality facility for determining whether or not personal items and luggage meet airline requirements. In one implementation, a semi-transparent three-dimensional image generated from a model of a personal item or luggage item of the maximum dimensions allowed by an airline is displayed to a user, on a user device that includes a camera, within an electronic image of the real scene encompassed by the field of view of the camera. The user can then position a real personal item or luggage item at a point in space corresponding to the apparent position of the virtual image of the model and compare the dimensions of the real personal item or luggage item to the dimensions of the semi-transparent model volume in order to determine whether or not the real personal item or luggage item meets airline size requirements.

20 Claims, 17 Drawing Sheets

(56) References Cited

OTHER PUBLICATIONS

Erin Lizzo, "Say Goobye to Oversized Luggage Stress! The Kayak & KLM Apps Use Augmented Reality to Size-up Your Carryon!", published on Oct. 28, 2018, retrieved from https://millionmilesecrets.com/news/kayak-klm-app-review/ on Jan. 27, 2021.*

Johnson, "Want to know whether your baggage is the right size for flying? Kayak app's new tool is a travel must", published Sep. 20, 2018, retrieved from https://clark.com/travel/kayaks-bag-measurement-tool-avoid-baggage-fees/ on Jan. 26, 2021.*

* cited by examiner

| # | x | y | z | connected to |
|---|---|---|---|---|
| 1 | $x_1$ | $y_1$ | $z_1$ | 2, 4, 5, 6 |
| 2 | $x_2$ | $y_2$ | $z_2$ | 1, 3, 5, 6 |
| 3 | $x_3$ | $y_3$ | $z_3$ | 2, 4, 5, 6 |
| 4 | $x_4$ | $y_4$ | $z_4$ | 1, 3, 5, 6 |
| 5 | $x_5$ | $y_5$ | $z_5$ | 1, 2, 3, 4 |
| 6 | $x_6$ | $y_6$ | $z_6$ | 1, 2, 3, 4 |

| # | x | y | z | connected to |
|---|---|---|---|---|
| 1 | $x_1$ | $y_1$ | $z_1$ | 2, 4, 5, 9 |
| 2 | $x_2$ | $y_2$ | $z_2$ | 1, 3, 6, 10 |
| 3 | $x_3$ | $y_3$ | $z_3$ | 2, 4, 7, 11 |
| 4 | $x_4$ | $y_4$ | $z_4$ | 1, 3, 8, 12 |
| 5 | $x_5$ | $y_5$ | $z_5$ | 1, 6, 8, 13 |
| 6 | $x_6$ | $y_6$ | $z_6$ | 2, 5, 7, 13 |
| 7 | $x_7$ | $y_7$ | $z_7$ | 3, 6, 8, 13 |
| 8 | $x_8$ | $y_8$ | $z_8$ | 4, 5, 7, 13 |
| 9 | $x_9$ | $y_9$ | $z_9$ | 1, 10, 12, 14 |
| 10 | $x_{10}$ | $y_{10}$ | $z_{10}$ | 2, 9, 11, 14 |
| 11 | $x_{11}$ | $y_{11}$ | $z_{11}$ | 3, 10, 12, 14 |
| 12 | $x_{13}$ | $y_{13}$ | $z_{13}$ | 4, 9, 11, 14 |
| 13 | $x_{13}$ | $y_{13}$ | $z_{13}$ | 5, 6, 7, 8 |
| 14 | $x_{14}$ | $y_{14}$ | $z_{14}$ | 9, 10, 11, 12 |

$$(X, Y, Z) \underset{h^{-1} \downarrow}{\overset{h \uparrow}{\longrightarrow}} (kX, kY, kZ, k) \text{ or } \begin{bmatrix} X \\ Y \\ Z \end{bmatrix} \underset{h^{-1} \downarrow}{\overset{h \uparrow}{\longrightarrow}} \begin{bmatrix} kX \\ kY \\ kZ \\ k \end{bmatrix}$$

$$\mathbf{w} = \begin{bmatrix} X \\ Y \\ Z \end{bmatrix}$$

$$\mathbf{w}_h = \begin{bmatrix} kX \\ kY \\ kZ \\ k \end{bmatrix}$$

$$\mathbf{P} = \begin{bmatrix} 1 & 0 & 0 & 0 \\ 0 & 1 & 0 & 0 \\ 0 & 0 & 1 & 0 \\ 0 & 0 & \frac{-1}{l} & 1 \end{bmatrix}$$

$$\begin{bmatrix} kx \\ ky \\ kz \\ k \end{bmatrix} = \mathbf{c}_h = \mathbf{P} \mathbf{w}_h = \begin{bmatrix} 1 & 0 & 0 & 0 \\ 0 & 1 & 0 & 0 \\ 0 & 0 & 1 & 0 \\ 0 & 0 & \frac{-1}{l} & 1 \end{bmatrix} \begin{bmatrix} kX \\ kY \\ kZ \\ k \end{bmatrix} = \begin{bmatrix} kX \\ kY \\ kZ \\ \frac{-kZ}{l} + k \end{bmatrix} \overset{h^{-1}}{\longrightarrow} \begin{bmatrix} \frac{lX}{l-Z} \\ \frac{lY}{l-Z} \\ \frac{lZ}{l-Z} \end{bmatrix} = \mathbf{c} = \begin{bmatrix} x \\ y \\ z \end{bmatrix}$$

$$\mathbf{P}^{-1} = \begin{bmatrix} 1 & 0 & 0 & 0 \\ 0 & 1 & 0 & 0 \\ 0 & 0 & 1 & 0 \\ 0 & 0 & \frac{-1}{l} & 1 \end{bmatrix}$$

$$\mathbf{w}_h = \mathbf{P}^{-1} \mathbf{c}_h$$
$$\mathbf{c} = \begin{bmatrix} x_0 \\ y_0 \\ 0 \end{bmatrix} \longleftrightarrow \begin{bmatrix} X \\ Y \\ 0 \end{bmatrix} = \mathbf{w}$$

FIG. 3C $$\mathbf{T}_{w_0} = \begin{bmatrix} 1 & 0 & 0 & -X_0 \\ 0 & 1 & 0 & -Y_0 \\ 0 & 0 & 1 & -Z_0 \\ 0 & 0 & 0 & 1 \end{bmatrix} \text{———} 370$$

$$\mathbf{R} = \mathbf{R}_\alpha \mathbf{R}_\theta = \begin{bmatrix} \cos\theta & \sin\theta & 0 & 0 \\ -\sin\theta\sin\alpha & \cos\theta\cos\alpha & \sin\alpha & 0 \\ \sin\theta\sin\alpha & -\cos\theta\sin\alpha & \cos\alpha & 0 \\ 0 & 0 & 0 & 1 \end{bmatrix} \text{———} 372$$

$$\mathbf{C} = \begin{bmatrix} 1 & 0 & 0 & -r_1 \\ 0 & 1 & 0 & -r_2 \\ 0 & 0 & 1 & -r_3 \\ 0 & 0 & 0 & 1 \end{bmatrix} \text{———} 374$$

$\mathbf{c}_h = \mathbf{P}\,\mathbf{C}\,\mathbf{R}\,\mathbf{T}_{w_0}\,\mathbf{w}_h$ ——— 376

$\mathbf{w}_h = \mathbf{T}_{w_0}^{-1}\,\mathbf{R}^{-1}\,\mathbf{C}^{-1}\,\mathbf{P}^{-1}\,\mathbf{c}_h$ ——— 378

$(x, z) = f(X, Y, Z, \text{camera\_parameters})$ ——— 380

$(X, Y, Z) = f^{-1}(x, z, \text{camera\_parameters})$ ——— 381

FIG. 3D

AUGMENTED-REALITY BAGGAGE COMPARATOR

CROSS-REFERENCE TO RELATED APPLICATION

This application claims the benefit of Provisional Application No. 62/808,606, filed Feb. 21, 2019.

TECHNICAL FIELD

The current document is directed to is directed to automated airline-flight-reservation systems and, in particular, to methods and subsystems that provide, to users, an automated augmented-reality facility for determining whether or not his or her personal items and luggage meet airline size requirements.

BACKGROUND

With the advent of the Internet and powerful personal processor-controlled computers, smart phones, and other computing devices, older methods for finding and booking flights, including in-person and telephone interactions with travel agents, have been largely supplanted by automated airline-flight-reservation Internet services. While, in many ways, these automated services are more convenient and time efficient, they generally fail to provide the personalized services that were previously provided as a result of long-term relationships between travel agents and their clients. Many of the automated airline-flight-reservation systems provide awkward and complex user interfaces, for example, and tend to provide a far greater number of flight selections and information than desired by users, who often would prefer to receive only a small number of flight selections that accurately reflect their preferences and who would often prefer not to be required to tediously input large numbers of parameters and invoke many different types of search filters in order to direct the automated airline-flight-reservation systems to search for desirable flights. For this reason, developers, owners and administrators, and users of automated airline-flight-reservation services continue to seek better, more effective, and more efficient implementations and user interfaces.

SUMMARY

The current document is directed to methods and systems that provide an automated augmented-reality facility for determining whether or not personal items and luggage meet airline requirements. In one implementation, a semi-transparent three-dimensional image generated from a model of a personal item or luggage item of the maximum dimensions allowed by an airline is displayed to a user, on a user device that includes a camera, within an electronic image of the real scene encompassed by the field of view of the camera. The user can then position a real personal item or luggage item at a point in space corresponding to the apparent position of the virtual image of the model and compare the dimensions of the real personal item or luggage item to the dimensions of the semi-transparent model volume in order to determine whether or not the real personal item or luggage item meets airline size requirements.

BRIEF DESCRIPTION OF THE DRAWINGS

FIGS. 3A-D illustrate one approach to mapping points in the world coordinate system to corresponding points on the image plane of a virtual camera.

DETAILED DESCRIPTION

The current document is directed to methods and subsystems that provide an automated augmented-reality facility for determining whether or not personal items and luggage meet airline size requirements. These methods and subsystems are generally incorporated within an automated flight-recommendation-and-booking system that provides a variety of travel-related services.

Figure 1A:
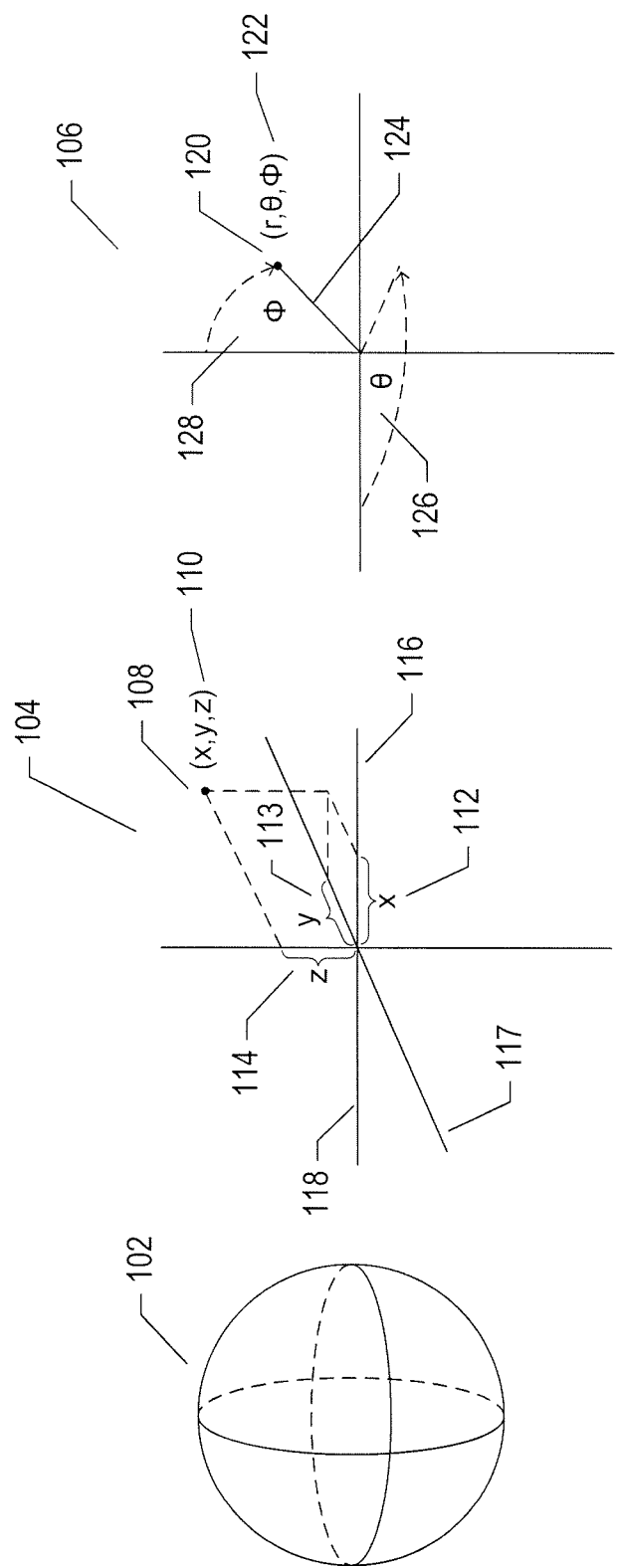
FIGS. 1A-D illustrate various types of three-dimensional models.
Figure 1B:
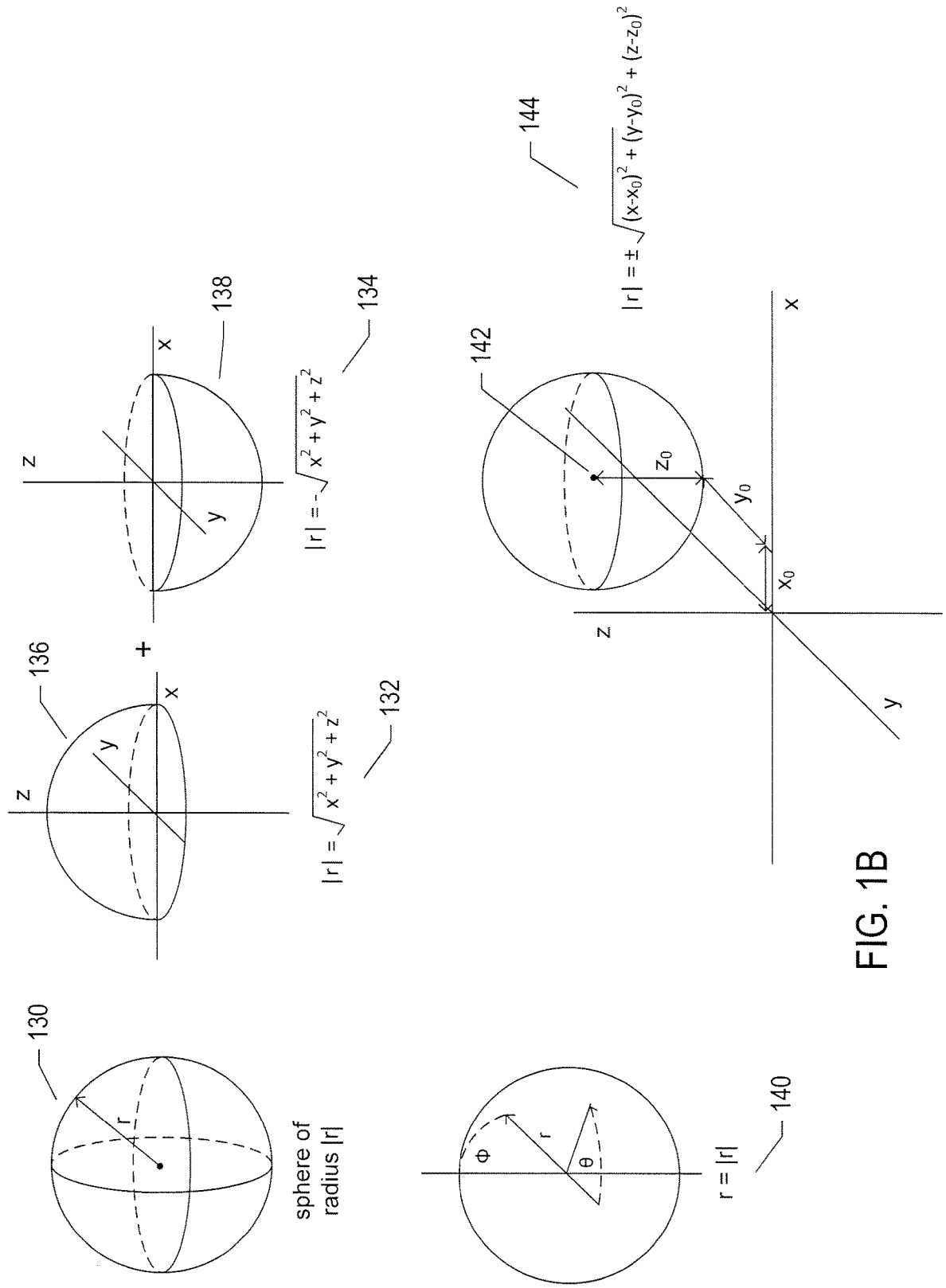

FIGS. 1A-D illustrate various types of three-dimensional models. In a first example, shown in FIGS. 1A-C, a sphere 102 is modeled. One approach to modeling a sphere is to use well-known analytical expressions for a sphere. This requires a coordinate system. Two common coordinate systems used for modeling include the familiar Cartesian coordinate system 104 and the spherical-coordinates coordinate system 106. In the Cartesian coordinate system, a point in space, such as point 108, is referred to by a triplet of coordinates (x, y, z) 110. The values of these coordinates represent displacements 112-114 along the three orthogonal coordinate axes 116-118. In the spherical-coordinates coordinate system, a point, such as point 120, is also represented by a triplet of coordinates (r, θ, φ) 122 that represent the magnitude of the vector 124 corresponding to the point and two angles θ 126 and φ 128 that represent the direction of the vector, as shown in FIG. 1A. As shown in FIG. 1B, a sphere of radius |r| 130 centered at the origin is described by two analytical expressions 132 and 134, in Cartesian coordinates, corresponding to the two half spheres 136 and 138, respectively. In spherical coordinates, the sphere is described by the simple expression 140. When the center of the sphere is located at a general position $(x_0, y_0, z_0)$ 142, the sphere is described by the expression 144. There are many different ways to represent surfaces analytically.

Figure 1C:
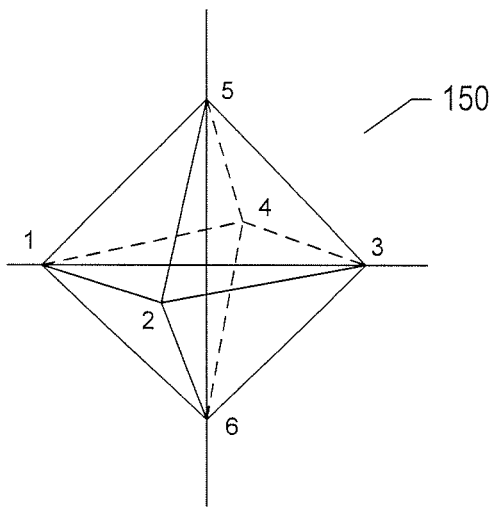
Figure 1C:
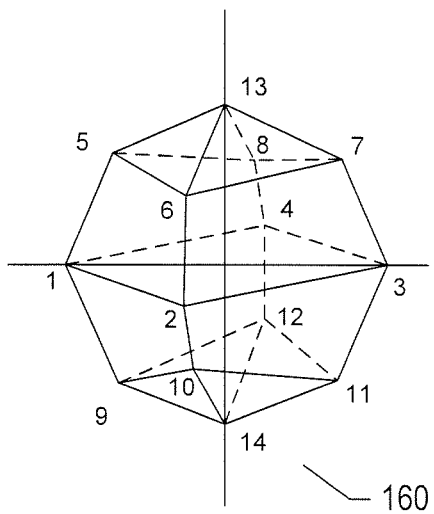
Figure 1D:
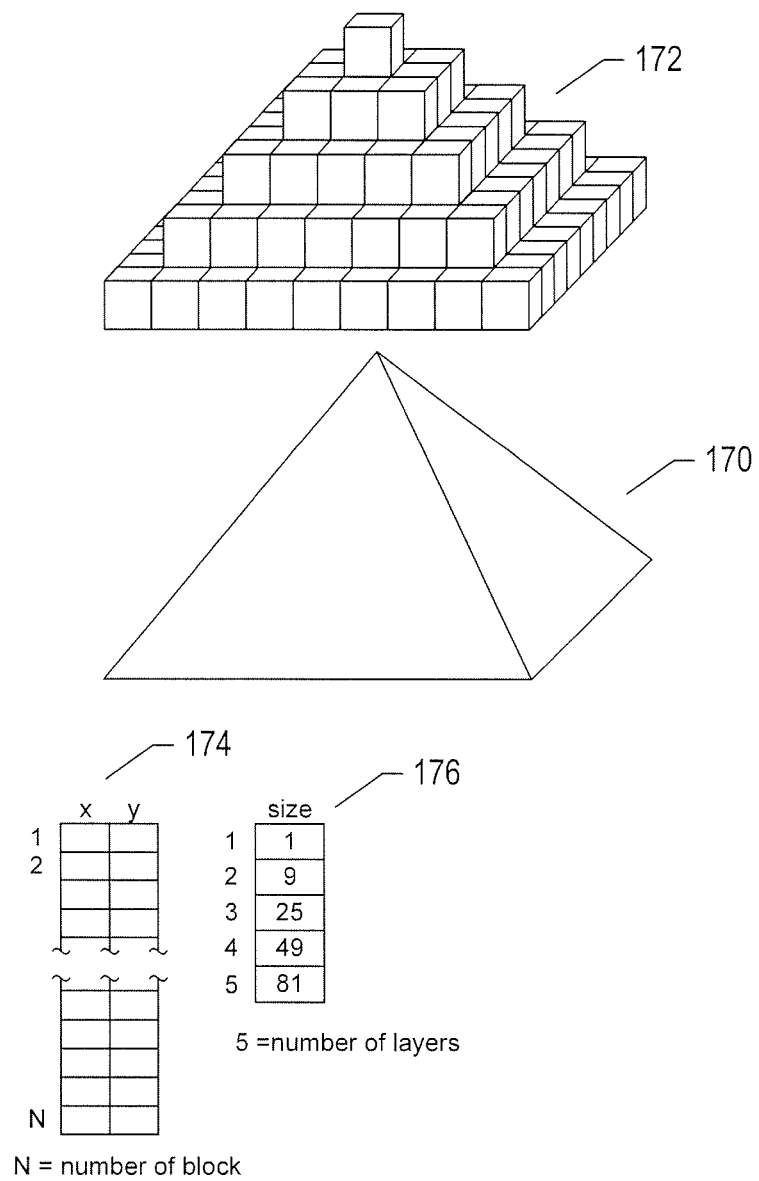

While analytical expressions are available for certain surfaces in three dimensions, they are not available for many other surfaces and, even were they available, it is often more computationally efficient to represent complex surfaces by a set of points. As shown in FIG. 1C, a sphere may be crudely represented by six points 150 and the triangular surfaces that each have three of the six points as vertices. These triangular surfaces represent facets of an octahedron, in the current example. A point-based model may be represented by a table 152 that includes the coordinates for the points as well as an indication of the line-segment connections between the points. As greater numbers of points are used 160 and 162, better approximations of the sphere are obtained. As shown in FIG. 1D, another method that can be used to model three-dimensional objects is to construct the objects from smaller regular objects. For example, a three-dimensional pyramid 170 with a square base can be modeled from a collection of cubes 172. The collection of cubes can be represented by a table of coordinates of the center of the cubes 174 or, alternatively, by an indication of the number of square layers and their sizes, in cubes, assuming that they are centered along a comment axis 176. Many other types of models of three-dimensional objects can be used to represent three-dimensional objects, including mixed models that employ analytical expressions for portions of the surfaces of the object or a combination of analytical expressions, points, and collections of small, regular objects.

Figure 2A:
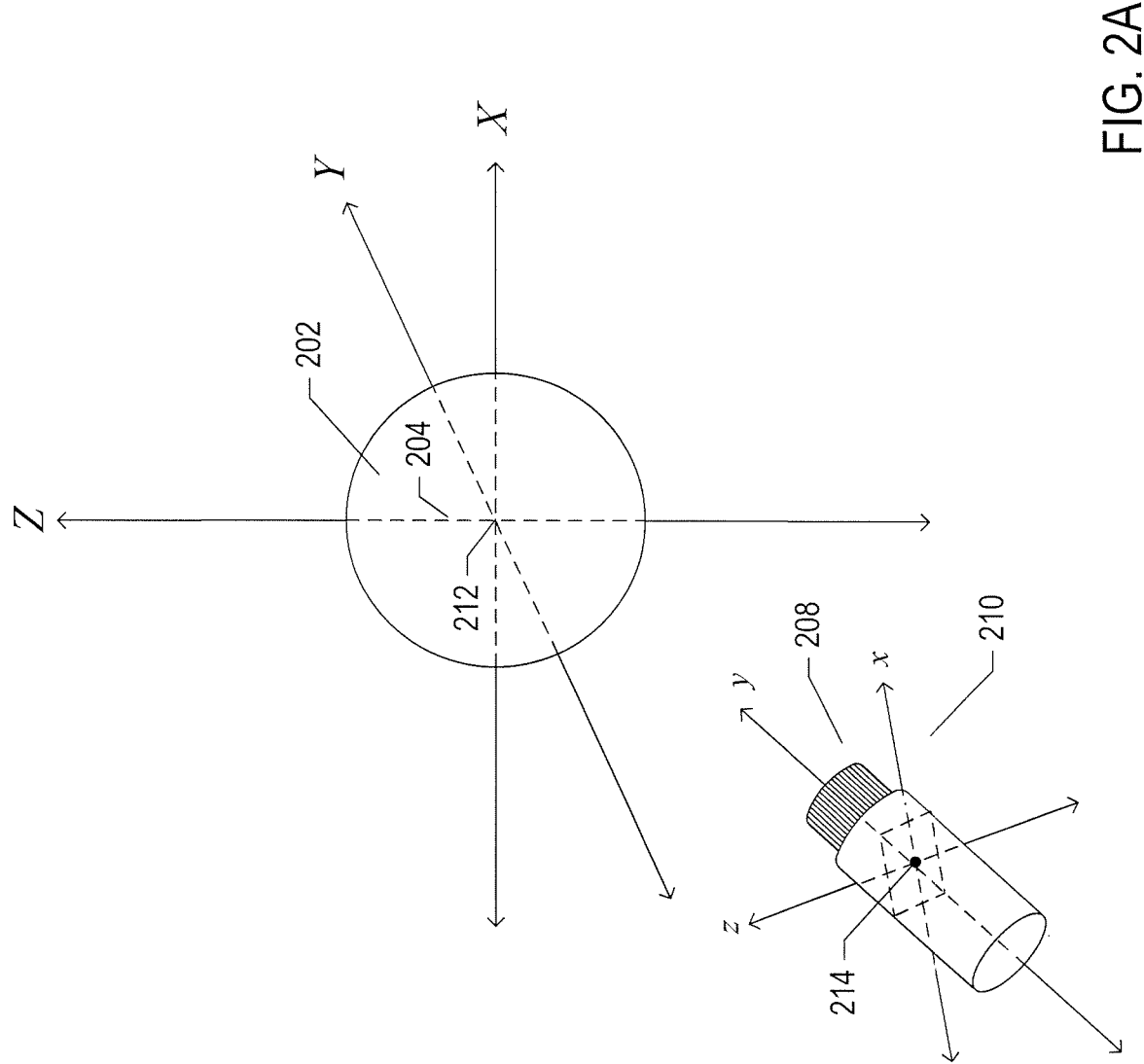
FIGS. 2A-B illustrate the relationship between a virtual-camera position and a three-dimensional model.
Figure 2B:
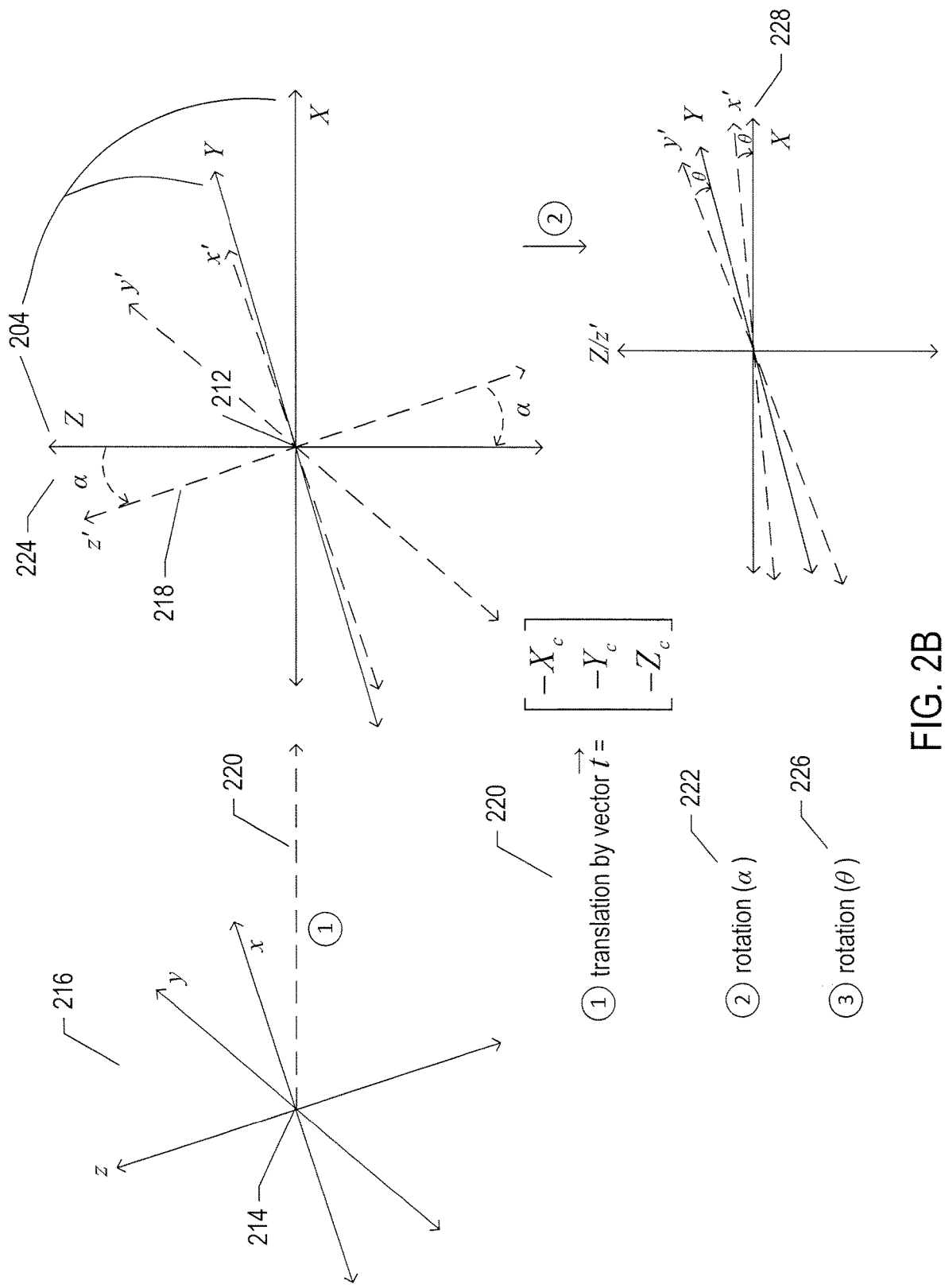

FIGS. 2A-B illustrate the relationship between a virtual-camera position and a three-dimensional model. As shown in FIG. 2A, the three-dimensional model of a sphere 202 is translationally and rotationally positioned within a three-dimensional world coordinate system 204 having three mutually orthogonal axes X Y, and Z. A two-dimensional view of the three-dimensional model can be obtained, from any position within the world coordinate system external to the three-dimensional model, by simulated image capture using a virtual camera 208. The virtual camera 208 is associated with its own three-dimensional coordinate system 210 having three mutually orthogonal axes x, y, and z. The world coordinate system and the camera coordinate system are, of course, mathematically related by a translation of the origin of the camera x, y, z coordinate system from the origin 212 of the world coordinate system and by three rotation angles that, when applied to the camera, rotate the camera x, y, and z coordinate system with respect to the world X, Y, Z coordinate system. The origin 214 of the camera x, y, z coordinate system has the coordinates (0, 0, 0) in the camera coordinate system and the coordinates ($X_c$, $Y_c$, and $Z_c$) in the world coordinate system. The two-dimensional image captured by the virtual camera 216 can be thought of as lying in the x, z plane of the camera coordinate system and centered at the origin of the camera coordinate system, as shown in FIG. 2.

FIG. 2B illustrates operations involved with orienting and positioning the camera x, y, z coordinate system to be coincident with the world X, Y, Z coordinate system. In FIG. 2B, the camera coordinate system 216 and world coordinate system 204 are centered at two different origins, 214 and 212, respectively, and the camera coordinate system is oriented differently than the world coordinate system. In order to orient and position the camera x, y, z coordinate system to be coincident with the world X, Y, Z coordinate system, three operations are undertaken. A first operation 220 involves translation of the camera-coordinate system, by a displacement represented by a vector t, so that the origins 214 and 212 of the two coordinate systems are coincident. The position of the camera coordinate system with respect to the world coordinate system is shown with dashed lines, including dashed line 218, with respect to the world coordinate system following the translation operation 220. A second operation 222 involves rotating the camera coordinate system by an angle α (224) so that the z axis of the camera coordinate system, referred to as the z' axis following the translation operation, is coincident with the Z axis of the world coordinate system. In a third operation 226, the camera coordinate system is rotated about the Z/z' axis by an angle θ (228) so that all of the camera-coordinate-system axes are coincident with their corresponding world-coordinate-system axes.

Figure 3A:
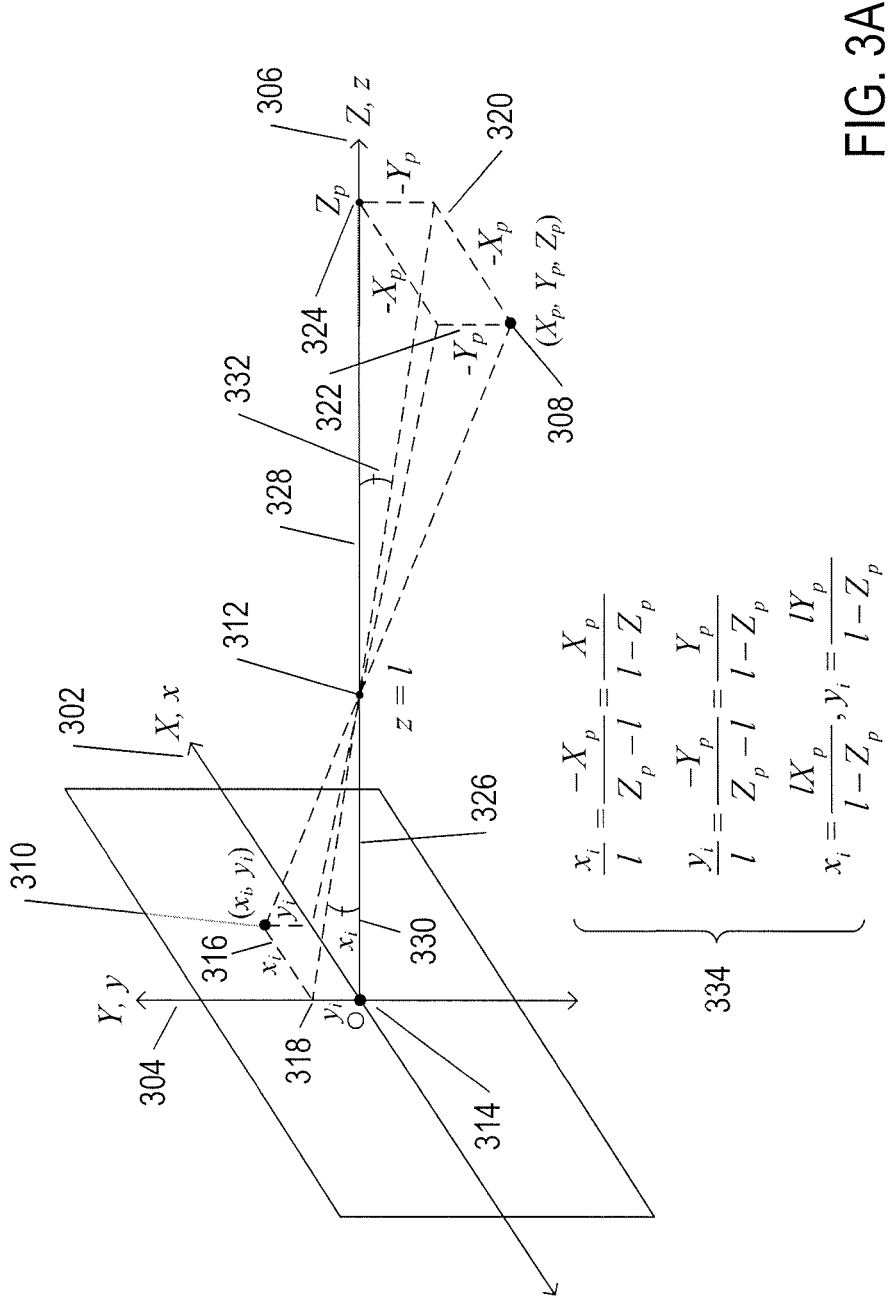

FIGS. 3A-D illustrate one approach to mapping points in the world coordinate system to corresponding points on the image plane of a virtual camera. This process allows virtual cameras to be positioned anywhere within space with respect to a computational three-dimensional model and used to generate a two-dimensional image that corresponds to the two-dimensional image that would be captured from a real camera having the same position and orientation with respect to an equivalent solid-model. FIG. 3A illustrates the image plane of a virtual camera, an aligned camera coordinate system and world coordinate system, and a point in three-dimensional space that is imaged on the image plane of the virtual camera. In FIG. 3A, and in FIGS. 3B-D that follow, the camera coordinate system, comprising the x, y, and z axes, is aligned and coincident with the world-coordinate system X, Y, and Z. This is indicated, in FIG. 3A, by dual labeling of the x and X axis 302, the y and Y axis 304, and the z and Z axis 306. The point that is imaged 308 is shown to have the coordinates ($X_p$, $Y_p$, and $Z_p$). The image of this point on the virtual-camera image plane 310 has the coordinates ($x_i$, $y_i$). The virtual lens of the virtual camera is centered at the point 312, which has the camera coordinates (0, 0, l) and the world coordinates (0, 0, l). When the point 308 is in focus, the distance l between the origin 314 and point 312 is the focal length of the virtual camera. Note that, in FIG. 3A, the z axis is used as the axis of symmetry for the virtual camera rather than the y axis, as in FIG. 2A. A small rectangle is shown, on the image plane, with the corners along one diagonal coincident with the origin 314 and the point 310 with coordinates ($x_i$, $y_i$). The rectangle has horizontal sides, including horizontal side 316, of length $x_i$, and vertical sides, including vertical side 318, with lengths $y_i$. A corresponding rectangle with horizontal sides of length $-X_p$, including horizontal side 320, and vertical sides of length $-Y_p$, including vertical side 322. The point 308 with world coordinates $X_p$, $Y_p$, and $Z_p$) and the point 324 with world coordinates (0, 0, $Z_p$) are located at the corners of one diagonal of the corresponding rectangle. Note that the positions of the two rectangles are inverted through point 312. The length of the line segment 328 between point 312 and point 324 is $Z_p$–l. The angles at which each of the lines passing through point 312 intersects the z, Z axis are equal on both sides of point 312. For example, angle 330 and angle 332 are identical. As a result, the principal of the correspondence between the lengths of similar sides of similar triangles can be used to derive expressions for the image-plane coordinates ($x_i$, $y_i$) for an imaged point in three-dimensional space with world coordinates ($X_p$, $Y_p$, and $Z_p$) 334:

$$\frac{x_i}{l} = \frac{-X_p}{Z_p - l} = \frac{X_p}{l - Z_p}$$

$$\frac{y_i}{l} = \frac{-Y_p}{Z_p - l} = \frac{Y_p}{l - Z_p}$$

$$x_i = \frac{lX_p}{l - Z_p}, y_i = \frac{lY_p}{l - Z_p}$$

Figure 3B:
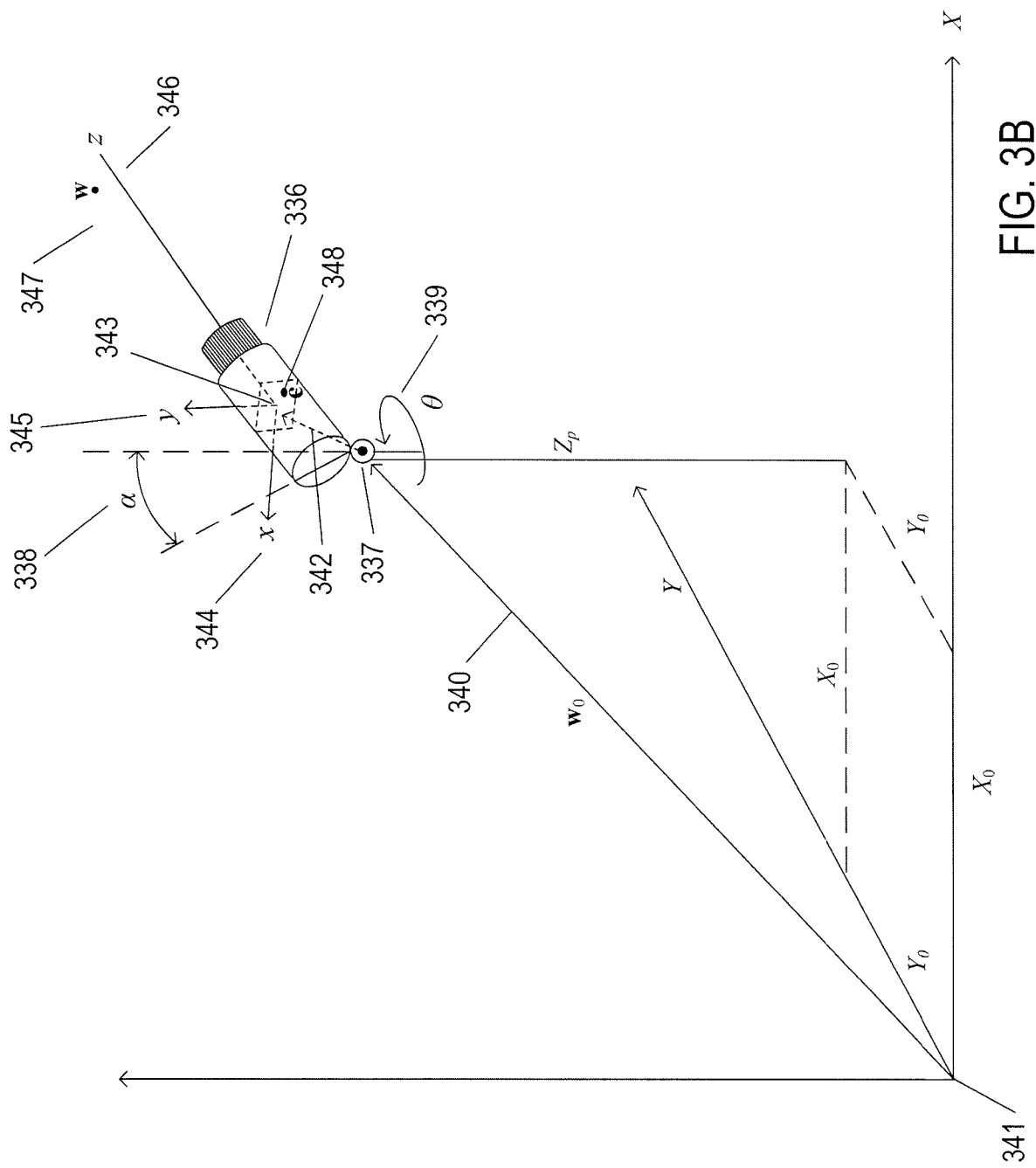

Of course, virtual-camera coordinate systems are not, in general, aligned with the world coordinate system, as discussed above with reference to FIG. 2A. Therefore, a slightly more complex analysis is required to develop the functions, or processes, that map points in three-dimensional space to points on the image plane of a virtual camera. FIGS. 3B-D illustrate the process for computing the image of points in a three-dimensional space on the image plane of an arbitrarily oriented and positioned virtual camera. FIG. 3B shows the arbitrarily positioned and oriented virtual camera. The virtual camera 336 is mounted to a mount 337 that allows the virtual camera to be tilted by an angle α 338 with respect to the vertical Z axis and to be rotated by an angle θ 339 about a vertical axis. The mount 337 can be positioned anywhere in three-dimensional space, with the position represented by a position vector $w_0$ 340 from the origin of the world coordinate system 341 to the mount 337. A second vector r 342 represents the relative position of the center of the image plane 343 within the virtual camera 336 with respect to the mount 337. The orientation and position of the origin of the camera coordinate system coincides with the center of the image plane 343 within the virtual camera 336. The image plane 343 lies within the x, y plane of the camera coordinate axes 344-346. The camera is shown, in FIG. 3B, imaging a point w 347, with the image of the point w appearing as image point c 348 on the image plane 343 within the virtual camera. The vector $w_0$ that defines the position of the camera mount 337 is shown, in FIG. 3B, to be the vector $$w_0 = \begin{bmatrix} X_0 \\ Y_0 \\ Z_0 \end{bmatrix}$$

FIGS. 3C-D show the process by which the coordinates of a point in three-dimensional space, such as the point corresponding to vector w in world-coordinate-system coordinates, is mapped to the image plane of an arbitrarily positioned and oriented virtual camera. First, a transformation between world coordinates and homogeneous coordinates h and the inverse transformation $h^{-1}$ is shown in FIG. 3C by the expressions 350 and 351. The forward transformation from world coordinates 352 to homogeneous coordinates 353 involves multiplying each of the coordinate components by an arbitrary constant k and adding a fourth coordinate component k. The vector w corresponding to the point 347 in three-dimensional space imaged by the virtual camera is expressed as a column vector, as shown in expression 354 in FIG. 3C. The corresponding column vector $w_h$ in homogeneous coordinates is shown in expression 355. The matrix P is the perspective transformation matrix, shown in expression 356 in FIG. 3C. The perspective transformation matrix is used to carry out the world-to-camera coordinate transformations (334 in FIG. 3A) discussed above with reference to FIG. 3A. The homogeneous-coordinate-form of the vector c corresponding to the image 348 of point 347, $c_h$, is computed by the left-hand multiplication of $w_h$ by the perspective transformation matrix, as shown in expression 357 in FIG. 3C. Thus, the expression for $c_h$ in homogeneous camera coordinates 358 corresponds to the homogeneous expression for $c_h$ in world coordinates 359. The inverse homogeneous-coordinate transformation 360 is used to transform the latter into a vector expression in world coordinates 361 for the vector c 362. Comparing the camera-coordinate expression 363 for vector c with the world-coordinate expression for the same vector 361 reveals that the camera coordinates are related to the world coordinates by the transformations (334 in FIG. 3A) discussed above with reference to FIG. 3A. The inverse of the perspective transformation matrix, $P^{-1}$, is shown in expression 364 in FIG. 3C. The inverse perspective transformation matrix can be used to compute the world-coordinate point in three-dimensional space corresponding to an image point expressed in camera coordinates, as indicated by expression 366 in FIG. 3C. Note that, in general, the Z coordinate for the three-dimensional point imaged by the virtual camera is not recovered by the perspective transformation. This is because all of the points in front of the virtual camera along the line from the image point to the imaged point are mapped to the image point. Additional information is needed to determine the Z coordinate for three-dimensional points imaged by the virtual camera, such as depth information obtained from a set of stereo images or depth information obtained by a separate depth sensor.

Three additional matrices are shown in FIG. 3D that represent the position and orientation of the virtual camera in the world coordinate system. The translation matrix $T_{w_0}$ 370 represents the translation of the camera mount (337 in FIG. 3B) from its position in three-dimensional space to the origin (341 in FIG. 3B) of the world coordinate system. The matrix R represents the $\alpha$ and $\theta$ rotations needed to align the camera coordinate system with the world coordinate system 372. The translation matrix C 374 represents translation of the image plane of the virtual camera from the camera mount (337 in FIG. 3B) to the image plane's position within the virtual camera represented by vector r (342 in FIG. 3B). The full expression for transforming the vector for a point in three-dimensional space $w_h$ into a vector that represents the position of the image point on the virtual-camera image plane $c_h$ is provided as expression 376 in FIG. 3D. The vector $w_h$ is multiplied, from the left, first by the translation matrix 370 to produce a first intermediate result, the first intermediate result is multiplied, from the left, by the matrix R to produce a second intermediate result, the second intermediate result is multiplied, from the left, by the matrix C to produce a third intermediate result, and the third intermediate result is multiplied, from the left, by the perspective transformation matrix P to produce the vector $c_h$. Expression 378 shows the inverse transformation. Thus, in general, there is a forward transformation from world-coordinate points to image points 380 and, when sufficient information is available, an inverse transformation 381. It is the forward transformation 380 that is used to generate two-dimensional images from a three-dimensional model or object corresponding to arbitrarily oriented and positioned virtual cameras. Each point on the surface of the three-dimensional object or model is transformed by forward transformation 380 to points on the image plane of the virtual camera.

Thus, by the methods discussed above, it is possible to generate an image of an object that would be obtained by a camera positioned at a particular position relative to the object. This is true for a real object as well as a representation of a real object, such as any of the representations discussed above with reference to FIGS. 1A-D.

Figure 4:
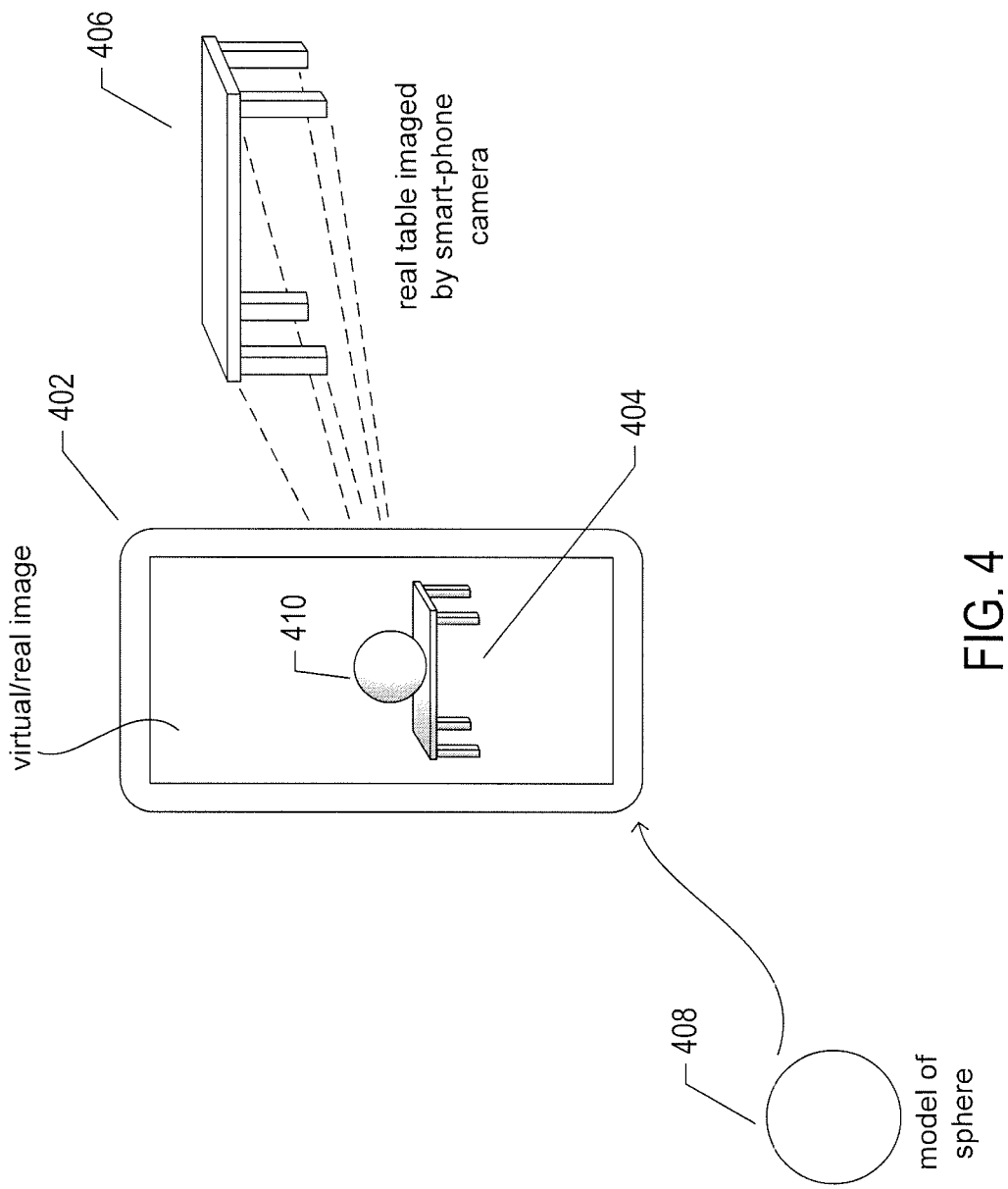
FIG. 4 illustrates an augmented-reality method that combines images of virtual objects with electronic images generated by a camera capturing light rays from a real scene.

FIG. 4 illustrates an augmented-reality method that combines images of virtual objects with electronic images generated by a camera capturing light rays from a real scene. In the example shown in FIG. 4, a camera-equipped device, such as a smart phone 402, can be controlled to display an electronic image of a real object 406 in the field of view of the camera. In addition, the camera-equipped device can be controlled to generate an image of an object 408 represented by a model, such as those discussed above with reference to FIGS. 1A-D, assuming that the object is positioned at a particular point in the real space that is currently being imaged by the camera. For example, as shown in FIG. 4, the modeled sphere is considered to be positioned at the center of the table 406, and so a virtual image of the sphere is generated, by the methods discussed above with reference to FIGS. 2A-3D, and incorporated into the displayed image so that it appears that the sphere is resting at the center of the table 410. Thus, the augmented-reality method provides a part real, part virtual image of a scene that can be viewed by a user as if the user were viewing an actual scene through the camera incorporated in the camera-equipped device.

Figure 5A:
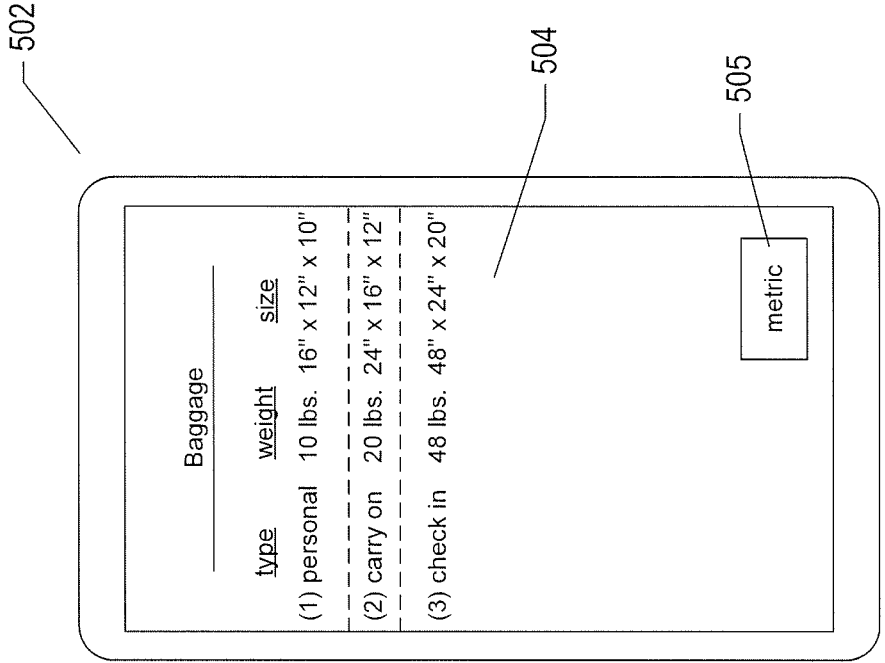
FIGS. 5A-D illustrates one implementation of the currently disclosed augmented-reality baggage comparator.
Figure 5B:
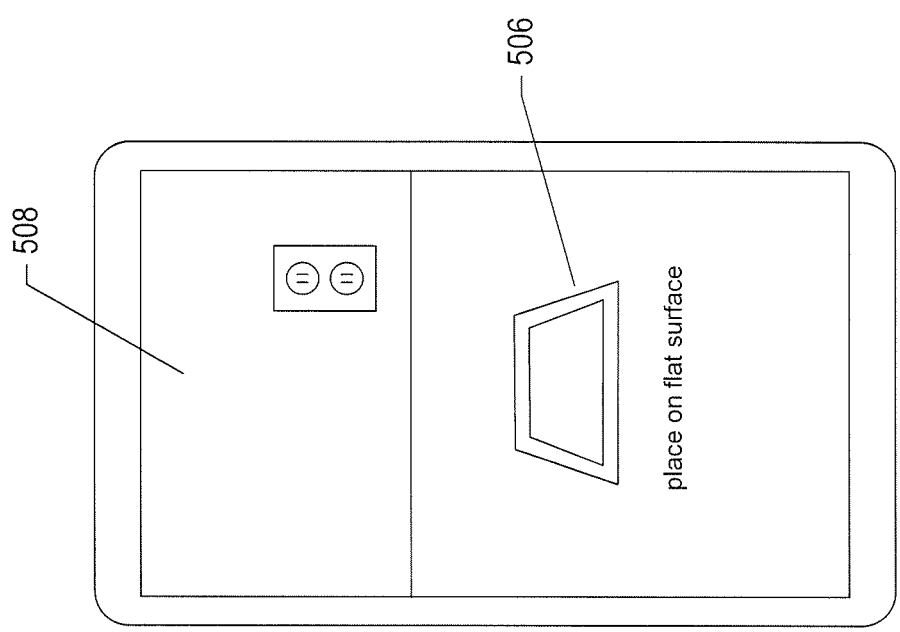
Figure 5C:
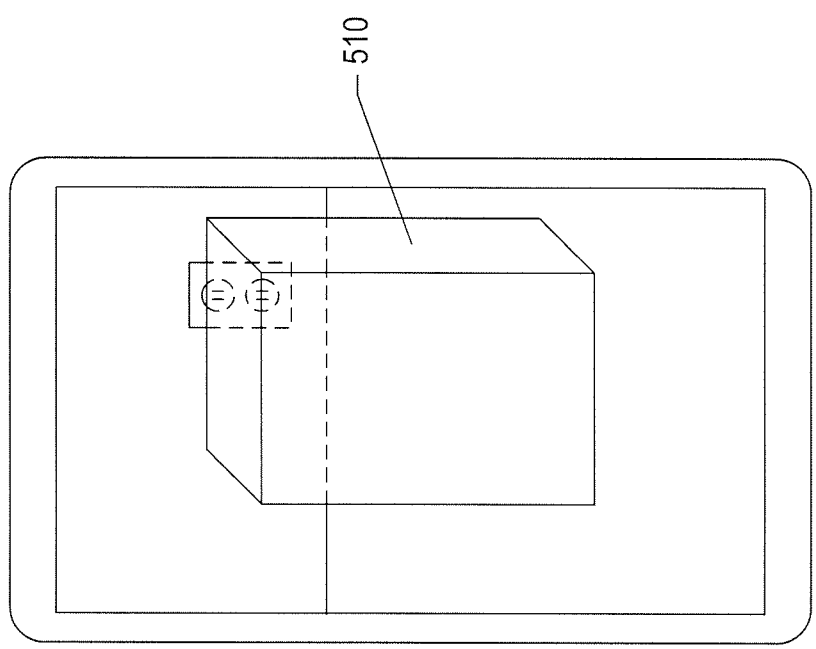
Figure 5D:
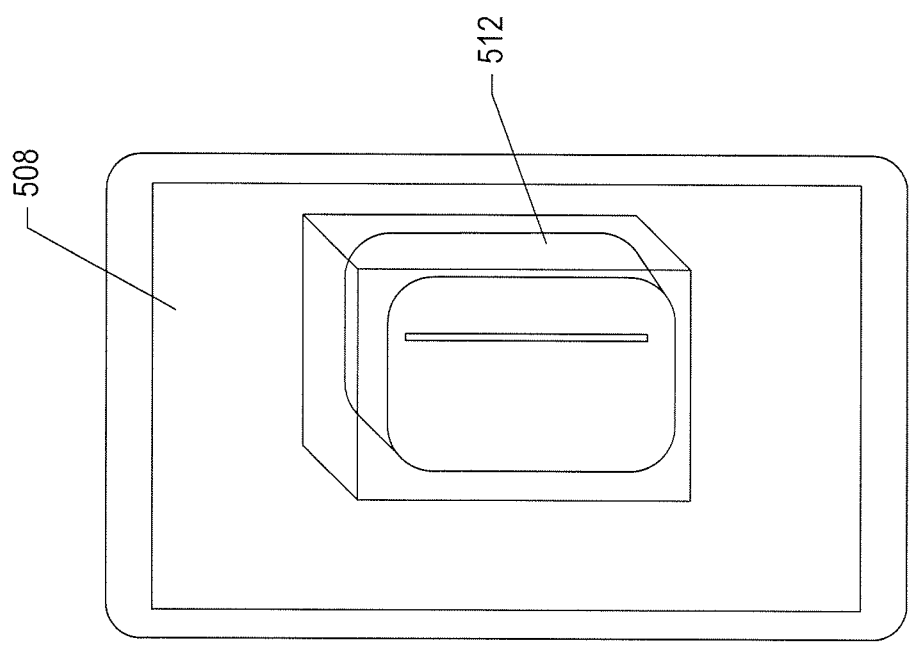

FIGS. 5A-D illustrates one implementation of the currently disclosed augmented-reality baggage comparator. The augmented-reality baggage comparator is often included in a subsystem of an automated flight-recommendation-and-booking system or other automated travel-arrangement system. When a user of an automated flight-recommendation-and-booking system has booked a flight or flights, and is preparing to travel, the user can invoke the argument-reality baggage comparator to determine whether or not the user's personal items, carry-on items, and/or checked-in baggage conform to the maximum-dimension standards for the airline providing the flight or flights. In the case that multiple flights have been booked as part of a single trip, the automated flight-recommendation-and-booking system can determine the most restrictive dimensional requirements for each type of personal item and luggage over all of the multiple flights. When the user initially invokes the augmented-reality baggage comparator using a personal device, such as a smart phone 502, as shown in FIG. 5A, the augmented-reality baggage comparator provide textural indications of the numbers of each type of personal item and luggage permitted for the planned trip as well as the dimensions for each type of personal item and luggage 504. When a user selects a particular type of item from the display, the augmented-reality baggage comparator, as shown in FIG. 5B, switches on the camera of the personal device and overlays a graphic 506, using the above-discussed augmented-reality method, on the electronic image 508 of the scene currently being captured by the personal-device camera. The graphic 506 represents a request for the user to translate and orient the phone in three-dimensional space so that the graphic corresponds to a relatively flat surface. Then, as shown in FIG. 5C, the augmented-reality baggage comparator generates a semi-transparent virtual image 510 of a model of a volume of maximum dimensions corresponding to the selected item and incorporates the virtual image in the real scene captured by the camera, using the augmented-reality method, with the virtual image positioned at the point selected by the user in response to the displayed graphic 506, as discussed above with reference to FIG. 5B. As shown in FIG. 5D, the user can then place a real personal item or luggage item 512 at the selected position in the real space so that the real personal item or luggage item is positioned within the semi-transparent virtual volume 510 displayed by the augmented-reality baggage comparator in the electronic image 508 displayed by the personal device. When the real personal item or luggage item appears to be fully contained within the semi-transparent virtual volume, the user is assured that the personal item or luggage item meets the maximum-dimensions requirements of the airline. The scene is continuously updated so that the user can move and reorient the camera but still perceive the semi-transparent virtual maximum-dimension volume to be located at the selected position. This is accomplished by monitoring the movement and orientation of the camera using built-in accelerometers and distance-measuring devices.

Figure 6A:
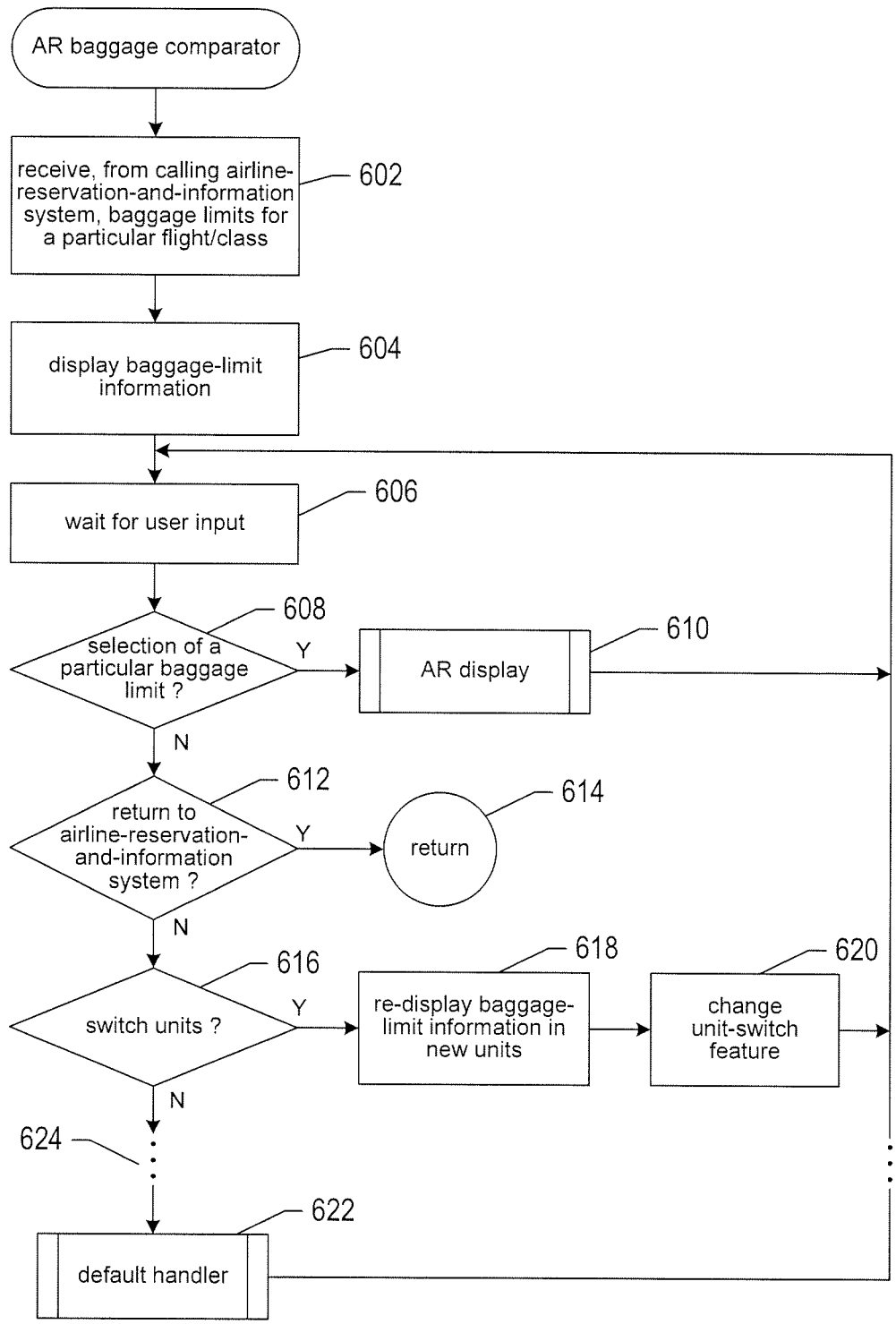
FIGS. 6A-B provide control-flow diagrams that illustrate one implementation of the currently disclosed augmented-reality baggage comparator.
Figure 6B:
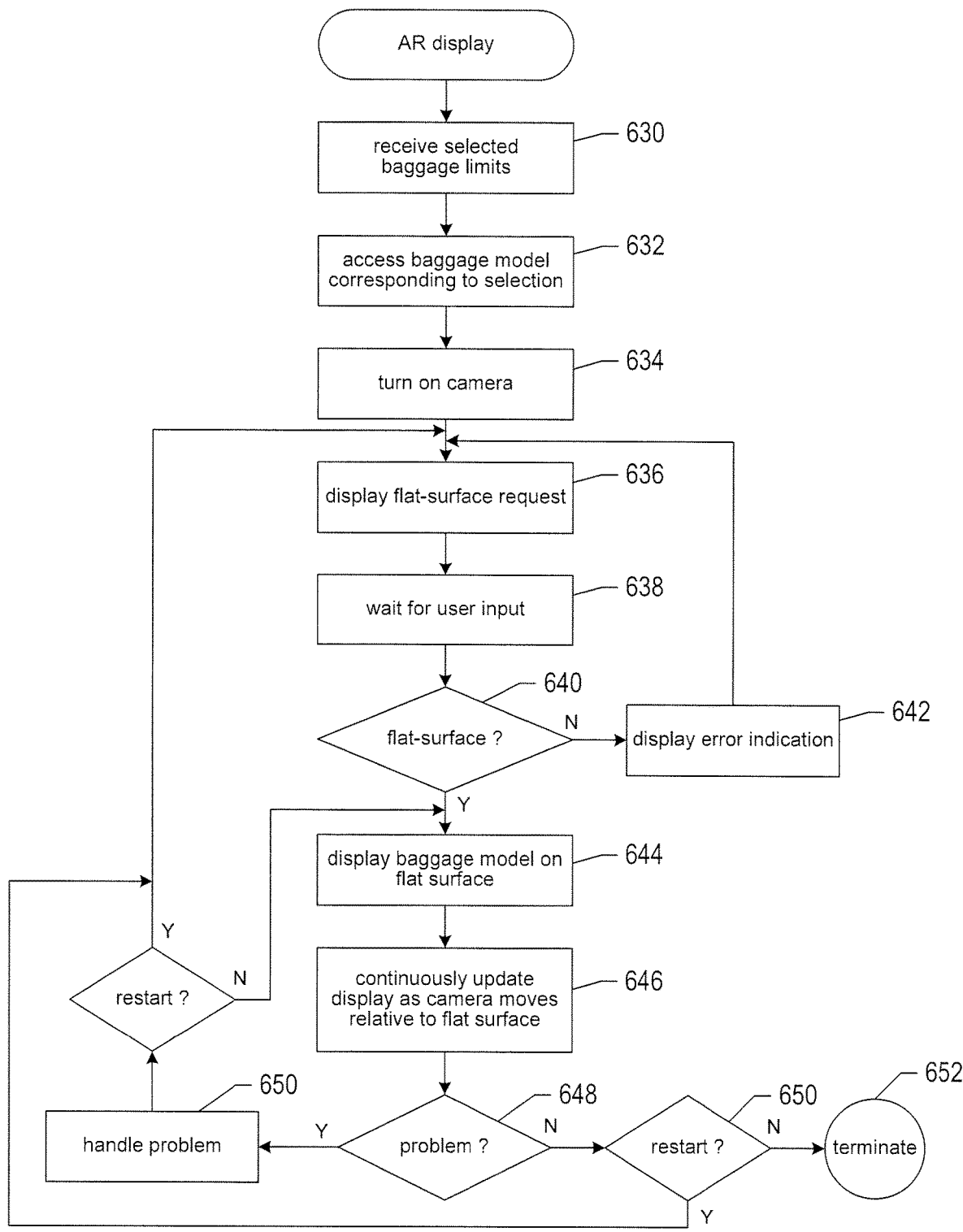

FIGS. 6A-B provide control-flow diagrams that illustrate one implementation of the currently disclosed augmented-reality baggage comparator. FIG. 6A provides a control-flow diagram of the high-level routine "AR baggage comparator." In step 602, the routine receives, from a calling airline-reservation-and-information system, the particular dimensional limits for baggage for a particular flight and travel class. In step 604, the routine displays the baggage-limit information, as discussed above with reference to FIG. 5A. In step 606, the routine waits for user input. In the case that the user selects a particular type of baggage, as determined in step 608, the routine "AR display" is called in step 610. When the user input indicates a desire to terminate the augmented-reality display, as determined in step 612, the routine turns off the user-device camera and returns to the calling system in step 614. When the user input requests, via a unit-change feature (505 in FIG. 5A), that the units in which the maximum dimensions are displayed be changed, as, for example, from US to metric units, as determined in step 616, the routine redisplays the baggage-limit information, and step 618, and then changes a unit-change feature. A default handler 622 handles various types of rare and unexpected inputs. Ellipses 624 indicate that many additional types of inputs and other events may be handled by the routine.

FIG. 6B provides a control-flow diagram for the routine "AR display," called in step 610 of FIG. 6A. In step 630, the routine "AR display" receives the baggage limits selected by the user in steps 606 and 608 of FIG. 6A. In step 632, the routine "AR display" accesses a three-dimensional model, or baggage model, corresponding to the selected baggage limits. In step 634, the routine "AR display" turns on the user-device camera. In step 636, the routine "AR display" displays the graphic (506 in FIG. 5B) that requests the user to position the camera so that the graphic corresponds to a relatively flat surface. In step 638, the routine "AR display" waits for user input. If the selected position does not appear to be a flat surface, based on distance-to-surface measurements made by the user device, as determined in step 640, the routine "AR display" displays an error message, in step 642, and control returns to step 636. Otherwise, in step 644, the routine "AR display" displays the semi-transparent maximum-dimension virtual volume in the electronic display of the flat surface selected by the user. In step 646, the routine "AR display" continuously updates the display as the camera moves relative to the selected flat surface. In other words, the user can move the camera about the real space while continuing to image the users baggage, and the virtual maximum-dimension of volume is recomputed and appropriately displayed to appear at the position selected by the user. If any problems occur during this continuously updated display, as detected in step 648, the routine "AR display" handles the problems in step 650 and either restarts the display process or resumes of the continuously updated display. Otherwise, if user input has requested restart of the display process, as determined in step 650, control returns to step 636. Otherwise, it is assumed that the user input requests termination of the display, and the display is terminated in step 652, with the camera being shut off.

Although the present invention has been described in terms of particular embodiments, it is not intended that the invention be limited to these embodiments. Modification within the spirit of the invention will be apparent to those skilled in the art. For example, any of a variety of different implementations of the currently disclosed methods and systems can be obtained by varying any of many different design and implementation parameters, including modular organization, programming language, underlying operating system, control structures, data structures, and other such design and implementation parameters. Rather than displaying semi-transparent maximum-dimension volumes, for example, the augmented-reality baggage comparator may instead display models of actual types of personal items and luggage. The augmented-reality baggage comparator may provide additional functionalities, such as screen capture of oddly shaped personal items and luggage that do not appear to fit within the displayed maximum-dimension volumes, and forwards these screen captures to airline agents in order to determine whether or not the airline might make special provisions for the oddly shaped personal items and luggage. The augmented-reality baggage comparator may be employed to determine whether or not an item conforms to dimensional restrictions for any of many different types of transport, including passenger airliners, trains, buses, and other vehicles.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An augmented-reality comparator comprising:
   a processor-controlled device that includes
      one or more processors,
      a memory,
      a camera,
      an electronic display that displays images of a real-world scene captured by a camera,
      stored information representing a graphic,
      stored information representing a semi-transparent virtual volume, and
      stored processor instructions that, when executed by one or more processors within the processor-controlled device, control the processor-controlled device to
         display, on the electronic display, images of the graphic at an apparent location in the real-world scene within the displayed images of the real-world scene captured by the camera by mapping the graphic at the apparent location in the real-world scene to an image plane of the camera,
         when the processor-controlled device is translated and/or oriented to superimpose the displayed images of the graphic onto images of a flat surface in the real-world scene captured by the camera, display, on the electronic display, images of the semi-transparent virtual volume positioned on the flat surface in the real-world scene by mapping the semi-transparent virtual volume positioned at the apparent location in the real-world scene to the image plane of the camera, and
         display images of the real-world scene including a real three-dimensional object positioned on the flat surface along with the displayed images of the semi-transparent virtual volume positioned on the flat surface.

2. The augmented-reality comparator of claim 1
   wherein the real three-dimensional object is a personal item, wherein personal items include carry-on bags and luggage that are stowed under seats or in baggage compartments by passengers;
   wherein the semi-transparent virtual volume represents the maximally-dimensioned volume for the personal item; and
   wherein the augmented-reality comparator provides a visual indication of whether or not the personal item has a volume contained within the maximally-dimensioned volume.

3. The augmented-reality comparator of claim 2 wherein the augmented-reality comparator operates cooperatively with an automated travel-recommendation-and-booking system to provide a simple, intuitive visual indication of whether a personal item meets the dimensional restrictions for the personal-item category to which the personal item belongs for a recommended or booked trip.

4. The augmented-reality comparator of claim 3 wherein, for a trip that includes multiple legs on different types of transport and/or transport provided by different organizations, the maximally-dimensioned volume represents the most restrictive dimensional requirements with respect to all legs of the trip.

5. The augmented-reality comparator of claim 1 wherein the processor-controlled device is a smart phone and the camera is a digital camera that continuously displays representations of the scenes within a field of view of the camera.

6. The augmented-reality comparator of claim 5 wherein the stored processor instructions further control the smart phone to:
   display textural indications of the numbers and maximum allowed dimensions of each object type of a set of object types; and
   when a particular type of object is selected,
      continuously display representations of the scenes within the field of view of the camera while overlaying, within the representations, the graphic.

7. The augmented-reality comparator of claim 6 wherein the stored processor instructions further control the smart phone to:
   generate a semi-transparent virtual image of a model of a volume corresponding to the maximum allowable volume for the selected type of object; and
   incorporate the virtual image in the representations of the scenes within the field of view of the camera, positioning the virtual image at a point selected in response to the displayed graphic.

8. The augmented-reality comparator of claim 7 wherein the stored processor instructions further control the smart phone to:
   when the object is positioned at the apparent location of the visual representation of the three-dimensional volume, display the semi-transparent virtual image of the model superimposed over all or a portion of the object.

9. A method that visually compares a first real object with a second virtual object, the method comprising:
   displaying an image of the second virtual object within a continuously updated electronic display of a scene within the field of view of a camera at an apparent location within the field of view of a camera by mapping the image of the second virtual object positioned at the apparent location in the scene to an image plane of the camera; and
   positioning the first real object at a location within the field of view of a camera corresponding to the apparent location of the image of the second virtual object, so that the first real object appears to be partially or fully contained within the image of the second virtual object.

10. The method of claim 9 wherein the electronic display and camera are incorporated within a smart phone.

11. The method of claim 9 wherein, prior to displaying the image of the second virtual object, a graphic is displayed to request that the camera be translated and oriented to position the graphic to correspond to a substantially flat surface in the scene.

12. The method of claim 9 incorporated into an automated travel-recommendation-and-booking system to allow clients of the automated travel-recommendation-and-booking system to determine whether their personal items and luggage are within dimensional restrictions specified for the personal items and luggage by transportation organizations.

13. The method of claim 9 wherein the image of the second virtual object is semi-transparent, so that the first real object can be seen within the image of the second virtual object.

14. The method of claim 9 wherein the image of the second virtual object is a semi-transparent model of a type of object that includes the first real object.

15. An automated flight-recommendation-and-booking system comprising:
   electronically stored information about flights, airlines, and other information relevant to air travel;
   a flight-recommendation-and-booking system, implemented within a cloud-computing facility, data center, or one or more Internet-connected servers; and
   an augmented-reality baggage comparator that displays an image of a virtual, semi-transparent maximum-dimension volume, by mapping the image of the virtual, semi-transparent maximum-dimension volume to an image plane of the camera, so that a user can attempt to position a real object within the virtual, semi-transparent maximum-dimension volume in order to determine whether or not the real object conforms to maximum allowed dimensions for a selected type of personal item or baggage.

16. The automated flight-recommendation-and-booking system of claim 15 wherein the virtual, semi-transparent maximum-dimension volume represents a most restrictive set of dimensional restrictions for the object for any flight of a multi-flight trip.

17. The automated flight-recommendation-and-booking system of claim 15 wherein the augmented-reality baggage comparator is implemented within a smart phone that incorporates the virtual, semi-transparent maximum-dimension volume into a displayed representation of a scene within the field of view of a camera within the smart phone.

18. The automated flight-recommendation-and-booking system of claim 15 wherein the virtual, semi-transparent maximum-dimension volume is a semi-transparent model of an example of a particular type of baggage.

19. The automated flight-recommendation-and-booking system of claim 15 wherein the augmented-reality baggage comparator
   displays information about each of multiple types of baggage;
   solicits selection of a particular type of baggage; and
   displays a virtual, semi-transparent maximum-dimension volume for the selected type of baggage.

20. A data-storage device encoded with processor instructions that, when executed by one or more processors of a processor-controlled device, control the processor-controlled device to visually compare a first real object with a second virtual object by:
   displaying an image of the second virtual object within a continuously updated electronic display of a scene within the field of view of a camera at an apparent location within the field of view of a camera by mapping the image of the second virtual object positioned at the apparent location in the scene to an image plane of the camera; and
   when an object is positioned at a location within the field of view of a camera corresponding to the apparent location of the image of the second virtual object, displaying the first real object as being partially or fully contained within the second virtual object.

* * * * *